United States Patent [19]
Leiber

[11] 3,980,346
[45] Sept. 14, 1976

[54] ANTI-LOCKING CONTROL SYSTEM FOR SIMULTANEOUS REGULATION OF STEERED WHEELS OR WHEELS ON A DIAGONAL OF VEHICLE

[75] Inventor: Heinz Leiber, Leimen, Germany

[73] Assignee: Teldix GmbH, Heidelberg, Germany

[22] Filed: July 10, 1975

[21] Appl. No.: 594,678

[30] Foreign Application Priority Data
July 10, 1974 Germany............................ 2433092

[52] U.S. Cl............................. 303/6 R; 188/181 A;
303/10; 303/22 R; 303/24 R; 303/21 A;
303/21 F
[51] Int. Cl.².......................................... B60T 8/04
[58] Field of Search......................... 303/21, 61–63,
303/6 R, 68–69, 22, 100, 115, 24; 188/181,
195

[56] References Cited
UNITED STATES PATENTS
2,869,687  1/1959  Keim et al. ................. 303/21 BB X
3,669,403  6/1972  Slavin et al.................... 303/21 F X

*Primary Examiner*—Trygve M. Blix
*Assistant Examiner*—Douglas C. Butler
*Attorney, Agent, or Firm*—Spencer & Kaye

[57] ABSTRACT

An improved anti-locking control system for the wheel brakes of four wheel vehicles having a braking system with dual brake lines each connected to the brakes associated with two wheels, which anti-locking control system is of the type in which the brake pressure is regulated jointly at two wheels by a brake pressure regulating unit connected in one of the brake lines and in which signals which are derived from the rotational behavior of two diagonally opposite wheels of the vehicle are fed to an evaluation circuit where brake pressure control signals are generated for the pressure regulating unit. According to the invention, the two wheel brakes connected to the brake line provided with the pressure regulating unit are the brakes of the diagonally opposite wheels whose rotational behavior is being evaluated or the brakes of the steered wheels of the vehicle; a switching arrangement is provided which alternatingly produces two operating states for the evaluation circuit, i.e., a first operating state in which the pressure is regulated when there is a tendency to lock at one wheel and a second operating state in which the pressure is regulated when there is a tendency to lock at both wheels whose rotational behavior is being evaluated; a normally open brake pressure control valve is connected in the other brake line, i.e., the brake line leading to the other or unregulated wheels; and the pressure control valve is closed when the pressure ($P_{ST}$) at the brakes connected to the output of the brake pressure control valve has a given relationship to the pressure ($P_R$) at the output of the brake pressure regulating unit.

51 Claims, 8 Drawing Figures

ANTI-LOCKING CONTROL SYSTEM FOR SIMULTANEOUS REGULATION OF STEERED WHEELS OR WHEELS ON A DIAGONAL OF VEHICLE

BACKGROUND OF THE INVENTION

The present invention relates to an anti-locking control system for four wheeled vehicles in which the brake pressure at two of the four wheels is regulated jointly through the use of a brake pressure regulating unit and in which signals providing information about the rotational movement behavior of two diagonally oppositely disposed wheels of the vehicle are fed to an evaluation circuit which produces therefrom brake pressure control signals for the pressure regulating unit.

Such an anti-locking control system is known from the periodical "Auto-Motor-Sport", Issue No. 26, 1973, pages 20 and 22. Based on the fact that the acceptance of anti-locking control units is hampered by their price, this article primarily describes an anti-locking control system in which the regulation is effected only by the pressure at the rear wheels and this with the aid of two sensors associated with these wheels as well as with a select-low type of control. When too much pressure is applied, this system results in blocked and thus uncontrollable front wheels on the vehicle.

The publication further mentions that instead of regulating the two rear wheels, it is possible to regulate only the wheels of one diagonal of the vehicle if a negative steering caster is provided. In this case, when the front axle is braked too heavily, the front wheel included in the regulating system will master the regulating action. Thus, in this case, the wheels of the unregulated diagonal will block when too much pressure is applied, the front wheel included in the regulating system is under control and thus steering capability is maintained and the second rear wheel will generally contribute little to the braking action. This system produces stability problems particularly on slippery, wet roads since the regulated diagonal is almost without pressure due to the low braking action of the front wheel so that a great difference in braking pressure results at the rear axle. Furthermore, on wet roads a great difference in braking pressure will occur at the front axle when the unregulated wheel locks.

SUMMARY OF THE INVENTION

It is the object of the present invention to provide a system of the above-identified type which is improved with respect to the realizable braking effect and driving stability without substantially increasing the expenditures therefor.

The above object is achieved by providing an improved anti-locking control system for the brakes of a four wheel vehicle having dual brake lines each connected to the brakes associated with two of the vehicle wheels wherein the anti-locking control system is of the type in which the brake pressure is regulated jointly at two wheels by means of a brake pressure regulating unit connected in one of the brake lines and in which signals which are derived from the rotational behavior of two diagonally opposite wheels of the vehicle are fed to an evaluation circuit where brake pressure control signals are generated for controlling the pressure regulating unit. According to the invention the two wheel brakes connected to the brake line provided with the pressure regulating unit are the brakes associated with the diagonally opposite wheels whose rotational behavior is being sensed and evaluated or the brakes of the steered wheels of the vehicle, and the control system further includes: switching means connected to the evaluation circuit means for alternatingly producing a first operating state for the evaluation circuit means in which the pressure is regulated when there is a tendency to lock at one of the diagonally disposed wheels whose rotational behavior is being sensed and a second operating state in which the pressure is regulated when there is a tendency to lock at both of the diagonally disposed wheels whose rotational behavior is being sensed; a normally open brake pressure control valve connected in the other of the dual brake lines, i.e., the brake line leading to the two unregulated wheels; and means are provided to close the pressure control valve when the pressure $P_{ST}$ at the brakes connected to the output of the brake pressure control valve has a given relationship to the pressure $P_R$ at the output of the brake pressure regulating unit.

The present invention thus covers two possible cases, i.e., the case where the brakes of the wheels of one diagonal have their pressure regulated together or the case where the steered wheels of a vehicle have their pressure regulated together. In both cases, however, the signals fed to the evaluation circuit are derived from a pair of diagonally disposed wheels and in the case when two diagonally disposed wheels are regulated the rotational behavior of these diagonally disposed wheels is evaluated. In this case it is not necessary for the sensor which produces the signal from the driven wheel to be disposed at the wheel itself, rather it may also be disposed at the vehicle differential and particularly at the so-called bevel gear. By changing the mode of operation of the evaluation circuit or controller between select-low (when one wheel tends to lock) and select-high (when both wheels tend to lock), which may occur at given intervals of, for example, 400 milliseconds and also upon the conclusion of one or a plurality of regulating cycles (e.g. counting off one or a plurality of acceleration signals), a good braking effect and good lateral control are achieved with regulation of the brake pressure at the steered wheels and an improved braking effect is obtained in the case of regulation of a pair of diagonally disposed wheels since now the regulated rear wheel also substantially contributes to the braking effect. The additional brake control valve in the brake effect. The additional brake control valve in the brake circuit of the other wheels, i.e., the unregulated wheels prevents overbraking of those wheels so that they will normally not lock and thus contribute to the stability of the vehicle, yet also contribute to the braking effect since they are operated in the partial braking range by the locked-in pressure if — which is particularly preferred with diagonal regulation — the pressure $P_{ST}$ is kept somewhat lower than the regulated pressure, $P_R$, i.e., the ratio $P_{ST}/P_R$ remains somewhat less than 1. In order to achieve this, the means for closing the brake control valve must be designed correspondingly. It should be noted that the expression that both pressures $P_{ST}$ and $P_R$ must have a certain relation to one another when the valve closes is intended to include the case where the valve is closed when a certain ratio of the pressures $P_{ST}/P_R$ is reached as well as the case when the pressures differ by a desired value.

In order to improve the system, the pressure $P_{ST}$ may be varied in dependence on the longitudinal deceleration of the vehicle and/or the transverse acceleration of the vehicle so that the difference between the pressure $P_{ST}$ and the pressure $P_R$ increases with increasing longitudinal deceleration or increasing transverse acceleration, respectively, of the vehicle. This influence is intended to prevent the wheels to which the pressure $P_{ST}$ is being introduced from becoming unstable under high longitudinal decelerations. The influence on the difference by the transverse acceleration is intended to produce more lateral force by less heavily braking the unregulated wheels. In a favorable manner, the influence of the transverse acceleration on the pressure $P_{ST}$ is selected to be higher than that produced by the longitudinal deceleration.

In the case where the steered wheels have their brake pressure regulated jointly, the load state of the vehicle is measured and the effect of the longitudinal deceleration on the pressure difference is varied by means of the measured value in the sense of a lesser effect of the longitudinal deceleration with a heavier load. This variation of the effect of the longitudinal deceleration can also be applied in stages.

The previously described brake pressure control valve is closed when the brake pressure in the controlled, i.e., unregulated, brake circuit has reached a certain level compared to the regulated brake circuit. If the pressure in the regulated brake circuit increases, the pressure in the controlled brake circuit is increased correspondingly. However, the pressure control valve may also be designed so that with decreasing pressure in the regulated brake circuit there will occur a corresponding reduction in pressure in the controlled brake circuit. As will be shown below, this pressure reduction may be limited. In such an embodiment providing a possibility to reduce the pressure, a sensor may also be attached to the unregulated front wheel and instead of connecting only the front wheel sensor of the regulated diagonal, these two sensors may be connected to the evaluation circuit for select-low operation. In this case the sensor associated with the unregulated wheel may effect a reduction in pressure in the regulated brake circuit and thus also in the controlled brake circuit, at least within limits (depending on which embodiment is preferred). A sensor attached to the differential for front wheel drive has a similar effect. However, signals produced by such a sensor must be evaluated by a different evaluation logic. In particular, in this case, a slip value which is much higher (more than 50%) than when the sensor is directly connected to the wheel must be selected since the one wheel may be locked and the sensor at the differential determines only the average of the two slip values from the two associated wheels.

The brake control valve used in the present invention may be designed in a variety of ways. It is possible to provide a movable member which is subjected on its opposed sides to the pressures $P_R$ and $P_{ST}$ or pressures derived therefrom. When a certain ratio between the pressures has been reached, this member will be displaced sufficiently to seat a valve body connected thereto on its seat so that a further pressure increase in the controlled brake circuit is prevented. In order to determine the pressure difference between the pressures $P_R$ and $P_{ST}$ at which the member is moved and the valve is closed, the surfaces of the movable member subjected to the pressures $P_R$ and $P_{ST}$ may, for example, have different dimensions, or the surfaces may be of the same size and the space on the side of the member exposed to the regulated pressure $P_R$ may be connected, via a pressure reduction valve (check valve with set tension) to the brake line for the regulated pressure, so that the pressure in this space will be somewhat less than the regulated pressure, and this lower pressure will determine the closing of the valve. In the latter case, a possible influence of the longitudinal deceleration and/or transverse acceleration on the pressure difference is preferably achieved by a change in the tension of the reduction or check valve. This can be effected by shifting the point of support of the tensioning spring by means of levers which are under the influence of the transverse acceleration and longitudinal deceleration forces.

According to one embodiment of the control valve according to the invention, the movable member is preferably designed as a piston, and in particular as a dual piston with a spring disposed therebetween. In such an embodiment of the brake control valve, the pressure $P_{ST}$ in the controlled brake circuit can be reduced by providing a valve body for the valve which is not permanently connected to the piston but rather can be displaced by a given amount against a spring force which prevents the valve bodies and pistons from approaching one another, and by providing the cylinder wall which surrounds the piston with an opening leading to a return line at such a point that when the piston moves, once the valve has closed, due to a reduction of the pressure $P_R$, the opening is exposed and thus pressure $P_{ST}$ drops.

If, as a result of a malfunction in the regulated brake circuit, the brake pressure control valve is maintained in the closed position, some means must be provided to prevent this closing of the brake pressure control valve from causing the other or controlled brake circuit from malfunctioning. For this purpose, a further piston is provided which is subjected to the uninfluenced pressures of both brake circuits and which is provided with such influencing means that the further piston is able, in the case of a malfunction of the regulated brake circuit and the resulting piston movement, to lift the valve body of the brake control valve from its seat.

According to another embodiment of the invention, the brake control valve is realized by a magnetic valve unit connected in the pressure inlet line for the brakes of the unregulated wheels and which is controlled by a unit including two pretensioned movable members which are exposed on one side to the pressure $P_{ST}$ or $P_R$, respectively. A lever is pivotally connected to these movable members so that its pivot angle and its position are determined by the difference between the two pressures $P_{ST}$ and $P_R$. Furthermore, a switch is provided which is actuated at a certain ratio of the pressures, and thus at a certain position of the lever, and which then actuates the magnetic valve unit. If a further switch is provided which is actuated when the regulated pressure drops and if the magnetic valve unit is designed so that the pressure line can be connected with a return line, it is also possible to reduce the pressure in the controlled, i.e., unregulated circuit. The influence of transverse acceleration and/or longitudinal deceleration can in this case be realized in that the distance between switch and lever is varied in dependence on these parameters.

Instead of one brake pressure control valve used according to the invention, it is possible to use one for each of the two unregulated wheels, with diagonally divided brake circuits. In this case the valves close when the difference between the pressures $P_R$ and $P_{ST}$ changes.

If, according to a further feature of the invention, a choke is provided in the line leading to the space where the pressure derived from $P_R$ acts on the movable member, the pressure in this space adapts itself, with a delay, to the actual pressure $P_R$. If at the same time the movable member is given freedom of movement beyond the position at which the valve body of the pressure reduction valve seats on its valve seat, then a reduction in pressure $P_R$ in the course of the regulation will result in a certain reduction in the pressure $P_{ST}$ due to the displacement of the movable member and the increased space adjacent the movable member, and when pressure $P_R$ slowly rises again the member will be pushed back, reducing the pressure space, and thus pressure $P_{ST}$ will increase slowly until the valve body has been unseated by the position of the member and thereafter the pressure increases rapidly. In order to prevent a delayed reduction of the pressure $P_R$ by the choke in the space adjacent the movable member, a one-way valve is connected in parallel with the choke between this space and the brake line carrying pressure $P_R$. If in a vehicle having its two brake circuits divided over the diagonal wheels, the wheels at which the brake pressure is being controlled each have an associated brake pressure control valve, it is favorable to design the brake pressure control valve associated with the front wheel to have dimensions as outlined above (i.e., choke, further mobility of the movable member) but to provide a faster follow-up of the pressure $P_R$ which influences the movable member for the other brake pressure control valve which is associated with the rear wheel.

In order to prevent the controlled circuit from malfunctioning when the regulated circuit fails, a safety valve in the form of a one-way valve may be connected in parallel with the brake pressure control valve to open when the brake pressure at its input is substantially higher than at its output. It is more favorable to connect the parallel-connected safety valve with a piston which is subjected to the regulated brake pressure and which closes the valve at a certain low level of the regulated pressure. When the regulated circuit malfunctions the valve is thus open.

Or, a safety valve which is connected with a piston can be connected in parallel with the brake pressure control valve and can be subjected to the controlled brake pressure. The piston closes the valve at a certain pressure of, for example, 50 bar.

In the anti-locking control system according to the present invention it is necessary, when the regulation takes place in a diagonal brake circuit, that the wheels have a low or negative steering caster or are provided with means to prevent yawing moments.

In the system according to the invention it is favorable to provided a steering angle sensor which emits a signal beginning with a given steering angle value. The signal is used to reduce the brake pressure in the regulated brake circuit in order to produce lateral stability. This pressure reduction occurs at the expense of the braking path; and it thus must become effective only under panic conditions, i.e., the selected limit steering angle must be selected appropriately large. Instead of the steering angle control or in addition thereto, a sudden change in the transverse acceleration (e.g. a jolt) could also be used to produce this pressure reduction. These steering angle values can also be made additionally dependent on the speed of the vehicle and/or on the deceleration of the vehicle in that at increasing speed of the vehicle the pressure reduction is initiated at smaller steering angles, and with increasing deceleration of the vehicle the pressure reduction is initiated at larger steering angles.

It has been mentioned above that two modes of operation are to be alternatingly effective, i.e., one mode of operation wherein both wheels have to show a tendency to lock in order to effect regulation and another mode of operation wherein only one wheel need exhibit a tendency to lock. When the two sensors are associated with two diagonally disposed wheels of the vehicle, the change in mode of operation can be simplified in that alternatingly the signals from the front wheel sensor and those from the rear wheel sensor are evaluated. The front wheel will usually be the first to exhibit a tendency to lock due to the distribution of the braking force, i.e., the use of its sensor signals corresponds to the mode of operation "regulation when one wheel tends to lock" (select low), while the use of the sensor signals from the rear wheel corresponds to the mode of operation "regulation when both wheels tend to lock" (select high). Favorably the sensors are alternatingly connected to the evaluation circuit.

Preferably, the regulation begins with select low operation. Therefore care must be taken that with the beginning of the braking process, the signals of the front wheel sensor are interrogated for some time. This time period, as well as the time periods for the alternating interrogation of the signals from various sensors are preferably a combination of a fixed basic time $t_0$ and a variable time earlier than that which begins with the connection of the corresponding sensor and ends with the beginning of the first pressure reduction.

Preferably the period a sensor is connected does not end at the end of time $t_0$, rather $t_0$ is followed by a time period which begins with the end of $t_0$ and ends at the disappearance of a slip signal and/or a wheel acceleration signal, i.e., before a switch is made the wheel being monitored is returned to the stable speed range.

As already mentioned the regulated front wheel will be the first to show a tendency to lock under panic conditions. It would therefore not make much sense to switch to the other sensor for the full time period right from the beginning. Therefore, according to a further feature of the invention, it is preferred to switch only temporarily to the rear wheel sensor (in case of a rapid deceleration) as long as no tendency to lock (slip signal and/or deceleration signal) is apparent. During this test period the pressure is always kept constant.

In special situations, the time periods during which the sensors are connected to the evaluation circuit are shortened. Thus, the time period during which the rear wheel sensor is connected is shortened to a time $t_1$, which is shorter than $t_0$, if a high amount of slip (e.g. > 20%) has been sensed and if in addition the vehicle deceleration measured by a separate vehicle deceleration gauge is slight. In this case it must be assumed that the rear wheel runs on ground with much less $\mu$, i.e., a lower coefficient of friction. A large reduction in pressure caused by the signals from the rear wheel sensor would here be inappropriate so that after $t_1$ the pressure reduction is interrupted and the system is switched back to operation by signals from the front wheel sensor. If there is a low $\mu$ on the side of the regulated front wheel, this will be evident in that during the initial connection of the front wheel sensor there will be only a low vehicle deceleration value inspite of the regulation. If the deceleration limit has not been reached, a further feature of the invention provides that after switching to the other sensor, a pressure is provided for a given time $t_b$ — and this is generally applicable. Time period $t_b$ is determined by $a \cdot t_a$, where $t_a$ is the time period of the last pressure build-up phase during connection of the other sensor and $a > 1$, e.g. 2 or 3.

If, in the above case of a low $\mu$ on the side of the regulated front wheel after switching to the rear wheel sensor the pressure has been introduced for a time period corresponding to $t_b$ without a regulating signal coming from the rear wheel sensor, this is a confirmation of a low $\mu$ on one side of the vehicle. After the end of $t_0$, during which time the introduced pressure is being maintained, the system is temporarily switched to the front wheel to determine whether the high slip signal is still present at the front wheel. If this is the case, the system is immediately switched back to the rear wheel, etc.

It has already been mentioned that a large steering angle or a great change in transverse acceleration is to effect a pressure reduction in the regulated brake circuit. At the same time, such a signal should effect switching to the front wheel sensor and after disappearance of the steering angle signal the front wheel sensor should stay connected for a period of time greater than $t_0$ e.g. 2–3 $t_0$, to effect regulation.

According to a further feature of the invention, if a vehicle with a regulated left front wheel drives through a sharp right turn (or with a regulated right front wheel through a left turn, respectively), thus producing a large steering angle signal ($\alpha$ signal), the front wheel sensor remains connected to the evaluation circuit until a given vehicle deceleration has been reached, and then the system is switched to the other sensor. Thereafter, at the beginning of the time when the rear wheel sensor is connected the pressure corresponding to time period $t_b$ is introduced.

DETAILED DESCRIPTION OF THE PREFFERED EMBODIMENTS

Figure 1:
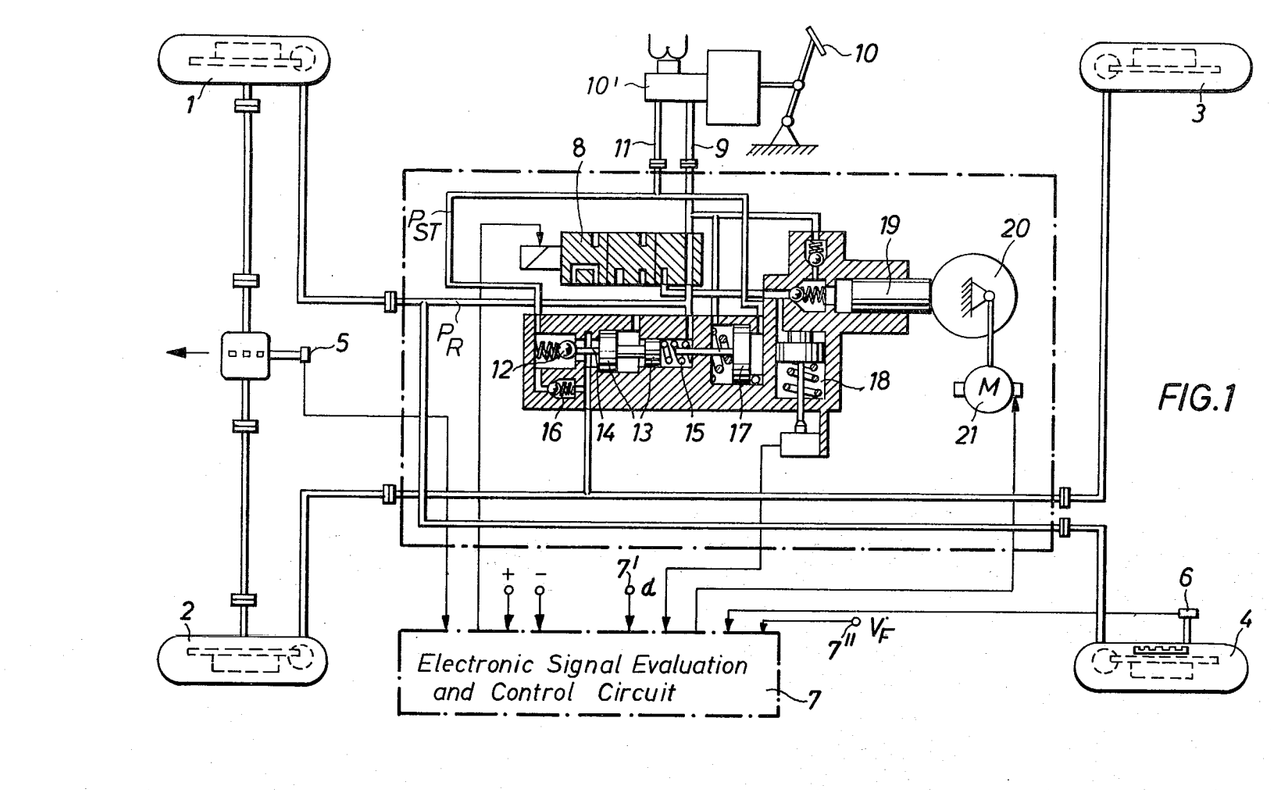
FIG. 1 is a schematic diagram of a first embodiment of an anti-locking control system according to the invention.

Referring now to FIG. 1 there is shown an embodiment of the invention for a front wheel drive vehicle having front wheels 1 and 2 and rear wheels 3 and 4. Wheel speed sensors 5 and 6 are provided to monitor the rotational behavior of diagonally disposed wheels 1 and 4 respectively of the vehicle. In the illustrated embodiment the sensor 5 for the wheel 1 is disposed at the differential of the vehicle with the bevel gear of the differential being utilized as the rotor of the sensor. It is to be understood, however, that the sensor 5 could be directly disposed on the wheel 1 in the same manner as the sensor 6. The outputs of sensors 5 and 6 are connected to the electronic evaluation and control circuit 7 of the anti-locking control system. In the circuit 7 the signals from the sensors 5 and 6 are successively evaluated and processed to produce pressure control signals for the pressure control unit 8 of the anti-locking control system. In the anti-locking control system according to the invention, only one pressure regulating unit 8 is provided which, as illustrated, is designed as a convention three position valve of the type used in such control systems and in its three positions can produce a pressure increase, a constant pressure, and a pressure reduction respectively in the brake line connected to its output. The pressure regulating unit 8 is connected in and regulates the pressure in a brake circuit 9 which includes the brakes of wheels 1 and 4 whose rotational behavior is being monitored and which constitutes one of a pair of brake circuits 9 and 11 connected to the output of a dual brake circuit master cylinder 10' controlled by a brake pedal 10.

The other diagonally opposite wheels 2 and 3 of the vehicle are jointly connected to the second brake circuit 11 in which a pressure control valve 12 is connected. This valve 12 is normally kept open by the plunger 14 connected to a pressure responsive movable member which as illustrated is piston 13 mounted in a cylinder. The piston 13 is a dual piston having opposite surfaces with different surface areas and which is normally held in the illustrated position, i.e., the position wherein the valve 12 is maintained in the open position, by a weak spring 15. The brake pressure $P_{ST}$ produced in the brake circuit 11 by the brake pedal 10, and hence acting on the brakes of the unregulated wheels 2 and 3, charges the left larger surface of the dual piston 13 while the regulated brake pressure $P_R$ appearing at the output of the pressure regulation unit or valve 8 charges the smaller right surface of the dual piston 13. Since spring 15 is a weak spring, valve 12 will close as soon as the pressure $P_{ST}$ at the brakes of wheels 2 and 3 approaches a certain ratio with the regulated pressure $P_R$ as determined by the different surface areas of the dual piston 13. This means that during pressure build-up in the dual brake circuits 9 and 11 the pressure at the brakes of the unregulated wheels 2 and 3 is always kept somewhat below the brake pressure at the regulated wheels 1 and 4, and that during the constant pressure and pressure reduction periods in the regulated brake circuit 9, as controlled by the anti-locking control circuit 7, the pressure present at the brakes of wheels 2 and 3 remains locked in. A later increase in the brake pressure at wheels 2 and 3 with a corresponding increase in the regulated pressure $P_R$ is, however, always possible.

Connected in parallel with the valve 12 is a safety valve 16 in the form of a tensioned check valve. The safety valve 16 is oriented so that it opens when the pressure at the output of valve 12 is substantially lower than the pressure at the input of valve 12. This effectively prevents the locking of valve 12 in the closed position when the regulated brake circuit 9 is malfunctioning.

A similar purpose is served by piston 17 which has its opposed surfaces exposed to the brake pressures directly produced in brake circuits 9 and 11 by the brake pedal 10. If the pressure in brake circuit 11 is substantially higher than the pressure in brake circuit 9, which can happen only if brake circuit 9 is malfunctioning, piston 17 will be moved in a direction toward the dual piston 13 and cause same to open valve 12.

Integral with the hydraulic unit thus far described is the conventional pressure medium or brake fluid return unit for such anti-locking control systems. As shown, the return unit includes the return pump, formed by motor 21, eccentric 20 and pump piston 19 and the reservoir chamber 18 which, in a known manner, accommodates the brake fluid discharged by the pressure regulating valve 8 and returns it to the brake pressure line.

As illustrated, in addition to the signals from the sensors 5 and 6, the electronic control unit 7 receives a signal, via a terminal 7', from a steering angle detector when a given steering angle of the vehicle has been exceeded and a signal, via a terminal 7'', from a vehicle deceleration detector when a given vehicle deceleration, e.g., 0.4 g, has been exceeded.

Figure 2:
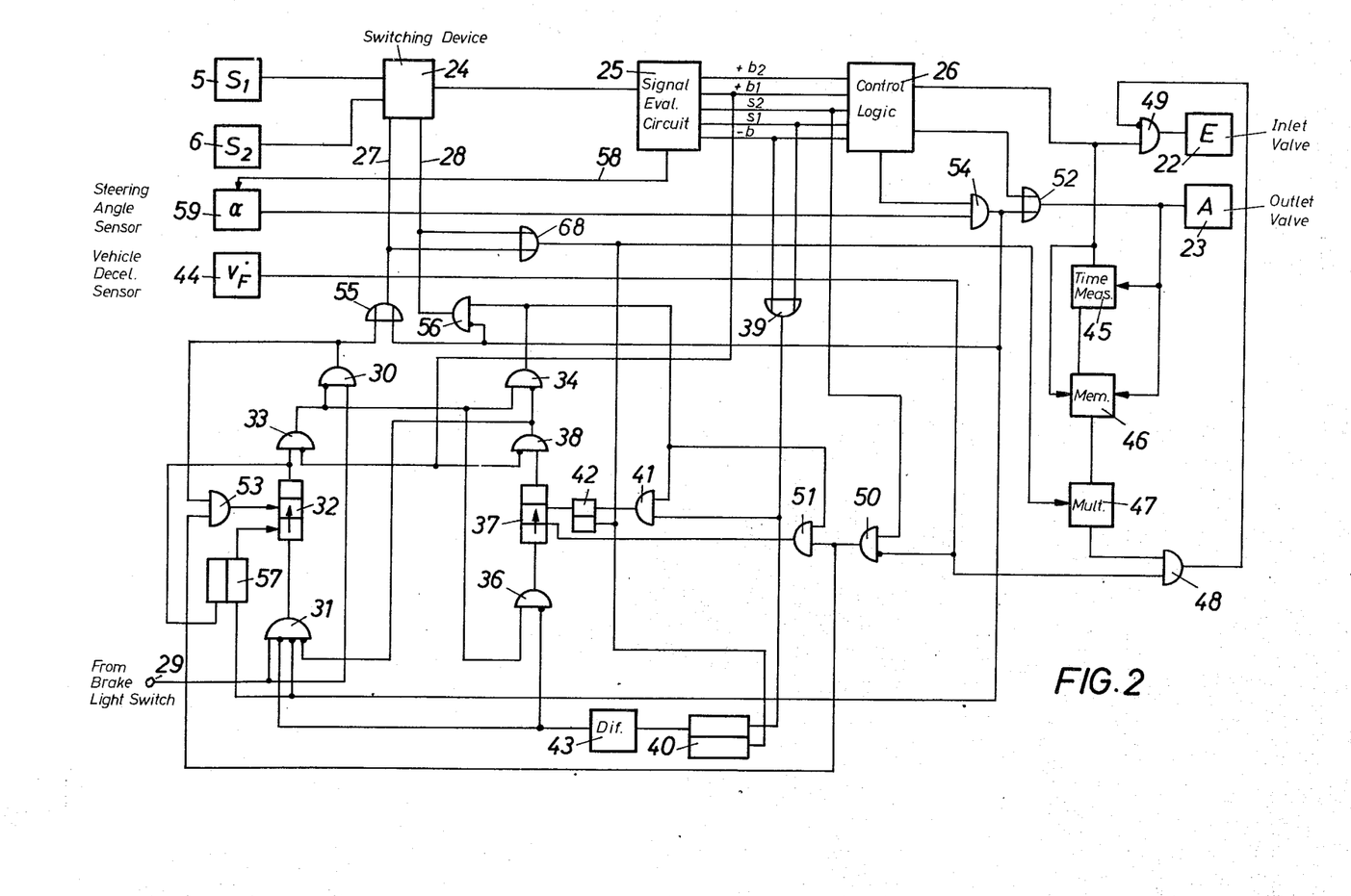
FIG. 2 is a block circuit diagram of an embodiment of an electronic control system according to the invention which can be used in the embodiment of FIG. 1.

Turning now to FIG. 2, there is shown an embodiment of a control circuit 7 for the arrangement of FIG. 1. In FIG. 2, the sensors 5 and 6 of FIG. 1 are shown again but the three position pressure regulating valve 8 of FIG. 1 is here shown as a valve combination including an inlet valve 22 and an outlet valve 23 which, as is well known in the art, can produce the same effect. In the description of FIG. 2 below, it is initially assumed that sensor 5 is disposed on the wheel 1 rather than on the differential as illustrated in FIG. 1.

The outputs of the sensors 5 and 6 are connected to a switching device 24 which alternatingly connects successive signals from the sensors 5 and 6 to the input of a conventional signal processing and evaluation circuit 25 for an anti-locking brake system controller, which in a known manner evaluates the input signals thereto and selectively produces the output signals on a plurality of output lines connected to a control logic circuit 26. In particular, the circuit 25 produces the following signals on its respective output lines; a delay signal $-b$ when a given value of wheel deceleration has been exceeded; a first slip signal $S_1$ when a first slip value, e.g., 10%, has been exceeded; a second slip signal $S_2$ when a second slip value, e.g. 20%, has been exceeded; a first acceleration signal $+b$, when a certain value of wheel acceleration has been detected; and a second acceleration signal $+b_2$ when a greater value of wheel acceleration is detected. In a known manner, from these output signals from the circuit 25, the control logic circuit 26 produces control signals for the pressure regulating valves 22 and 23 in the regulated brake circuit. The control logic circuit may be similar to that described in U.S. Pat. No. 3,754,797.

In order to alternatingly connect the sensors 5 and 6 to the circuit 25, the switching device 24 is alternatingly switched between two positions via control signals on control lines 27 and 28. In the illustrated embodiment, a signal on control line 27 connects the sensor 5 to the circuit 25 and a signal on control line 28 connects the sensor 6. The standard sequence of operation is as follows: upon actuation of the brake system a signal appears at terminal 29 via the brake light switch of the vehicle and this signal is fed via AND gate 30 and OR gate 50 to control line 27 to cause switching device 24 to initially connect sensor 5 to the signal processing circuit 25. At the same time the signal from terminal 29 is fed via AND gate 31 to delay member 32 which has a normal delay time constant $t_0$, for example, 400 msec. After $t_0 = 400$, the delay member 32 produces an output signal which is fed via AND gate 33 to AND gate 30 to block same. Thus the control signal on line 27, and the connection period for sensor 5, is terminated.

The output signal from AND gate 33 is also fed to the AND gate 34 causing same to become conductive, and via AND gate 56, to produce a control signal on line 28 and thus cause switching device 24 to connect sensor 6 to the circuit 25. The signal at the output of AND gate 33 is also fed via AND gate 36 to the delay member 37 which has a normal time constant or delay time of, for example, 50 msec. After this delay time the output signal from delay member 37 causes AND gate 38 to produce an output signal which blocks AND gate 34, and thus the connection of the rear wheel sensor 6 to the circuit 25 is terminated. The output signal from AND gate 38 also blocks AND gate 31 and thus causes time member 32 to reset, thus terminating its output signal. This in turn terminates the blocked state of AND gate 30 and the described process begins anew. Note that in this switching process the rear wheel sensor 6 is connected to the circuit 25 for a shorter period of time than the front wheel sensor 5.

If during the time period when the sensor 5 is connected a pressure reduction signal, i.e., a slip signal and/or a $-b$ signal, appears, then the time period $t_0$ determined by the time member 32 should begin only with this pressure reduction signal. Accordingly, the output lines of circuit 25 corresponding to these signals are connected via an OR gate 39 to one input of a bistable trigger circuit 40. Upon the appearance of an $S_1$ or a $-b$ signal, the circuit 40 changes its state and the change in the output signal of circuit 40 is differentiated in a differentiator 43 and the resulting spike is utilized for the temporary blocking of AND gate 31. This causes the time delay for delay member 32 to start again, i.e., $t_0$ begins. If during time when the sensor 6 is connected, and hence AND gate 41 is enabled via the output signal from gate 34, and output signal from OR gate 39 appears. This output signal will cause gate 41 to produce an ouput signal which switches a bistable circuit 42, which in turn switches the time constant of delay member 37 to a longer time constant corresponding to $t_0$, i.e., upon the occurrence of regulating signals the longer time constant $t_0$ applies and thus sensor 6 is connected for just as long a time period as sensor 5. At the same time the peak at the output of the differentiating circuit 43 blocks AND gate 36 and produces a new start for time constant $t_0$ of the time member 37, if during the connection of sensor 6 pressure regulation signals appear. The bistable circuits 40 and 42 are reset at the end of each connection period via the output signal from the OR gate 68 connected to the control lines 27 and 28.

In order to assure that the wheel whose sensor 5 or 6 produces the pressure regulation reaches the stable operating range before the end of the regulation period with that sensor, switching to the other sensor does not occur at the end of $t_0$ but at the end of the $+b_1$ acceleration signal. Accordingly, the $+b_1$ signal output of circuit 25 is connected to the inverted input of gates 33 and 38 to block same, i.e., the presently running time period of the connection of one of sensors 5 or 6 can be terminated only after the end of the $+b_1$ signal by blocking one of gates 30 or 34 with the signal from time delay member 32 or 37, respectively.

When the vehicle deceleration is slight as determined by a vehicle deceleration responsive device 44, i.e., a device which will not emit a signal when the deceleration is less than, for example, 0.4 g, an introduction of pressure into the regulated brake circuit is initiated. Devices 45 and 48 are provided for this purpose. Device 45 is connected to the pressure increase output line of circuit 26 and measures the pressure build-up period $t_a$ for each regulating cycle. Upon the appearance of a reduction signal on the control line to outlet valve 23, the measured value $t_a$ in device 45 is transferred into an intermediate memory 46 and is erased in device 45. If a new pressure build-up phase follows without a switching signal from control line 27 or 28 via OR gate 68 having ordered the transfer of the stored value to member 47, the new pressure build-up signal erases memory 46. If the switching signal from OR gate 68 is fed to member 47, the member 47 produces a control signal of the length $t_b = at_a$, where $a > 1$, from the stored last pressure build-up period $t_a$ and this signal is fed via AND gate 48 when a low vehicle deceleration value is present to AND gate 49 and blocks this gate so that a pressure build-up becomes possible during time $t_b$. This pressure build-up can be pulsed, just as the control signals from circuit 26 should preferably be pulsed signals.

If a lower $\mu$ or coefficient of friction were present on the side of the vehicle where the regulated rear wheel is disposed, it would not make any sense to regulate over the full length of the switching time period of the signals from the rear wheel sensor since then too much pressure would be reduced. In this case, which during connection of the rear wheel sensor is distinguished by high slip and also low vehicle deceleration, the time delay member 37 is switched via AND gates 50 and 51 to a shortened time constant so that pressure reduction time is shortened. The output signal from AND gate 50 which emits a signal at high slip and low vehicle deceleration, also acts, via AND gate 53, on the time constant of time delay member 32 in the sense of a delay but is effective only when sensor 5 is connected, i.e., when AND gate 30 is conductive. If during connection of the front wheel sensor 5, high slip and low vehicle deceleration are noted, the conclusion is a low $\mu$ on the side of the vehicle having the regulated front wheel. Therefore, a long connection of the front wheel which would effect a pressure reduction will not be necessary.

When a given steering angle is exceeded as detected by the steering angle detector 59 a pressure reduction signal is generated during continuous control via AND gate 54. The output signal from AND gate 54 also causes the switching unit 24 to immediately connect front wheel sensor 5 to the circuit 25 by producing an output signal from OR gate 55 and blocking AND gate 56, and causes the gate 31 to be locked so that at the end of the steering angle signal ($\alpha$) the time delay member 32 can restart. Furthermore, the output signal from AND gate 54 sets the bistable circuit 57 which then causes the time constant of time delay member 32 to be increased to a relatively long time constant (2 to 3 $t_0$) during which sensor 5 remains connected. Resetting of bistable circuit 57, which may, for example, be a flip-flop, is effected at the end of this longer time period (2 to 3 $t_0$). As already mentioned, the limit value of the steering angle which initiates the pressure reduction, can be made dependent on the vehicle speed in that the limit steering angle decreases with increasing speed. In addition, a dependence on the vehicle deceleration may also be provided. The influence of the vehicle speed on the limit steering angle is indicated in FIG. 2 by line 58 between the signal processing circuit 25 and steering angle detector 59.

If instead of being mounted on the regulated wheel 1, the sensor 5 is disposed on the front axle differential of the vehicle as shown in FIG. 1, the signal processing device 25 must be modified in that a switch to higher slip values must now be made, when the system is switched from regulation by signals from the sensor 6 to regulation by signals from the sensor 5 at the differential, as mentioned above.

Figure 3:
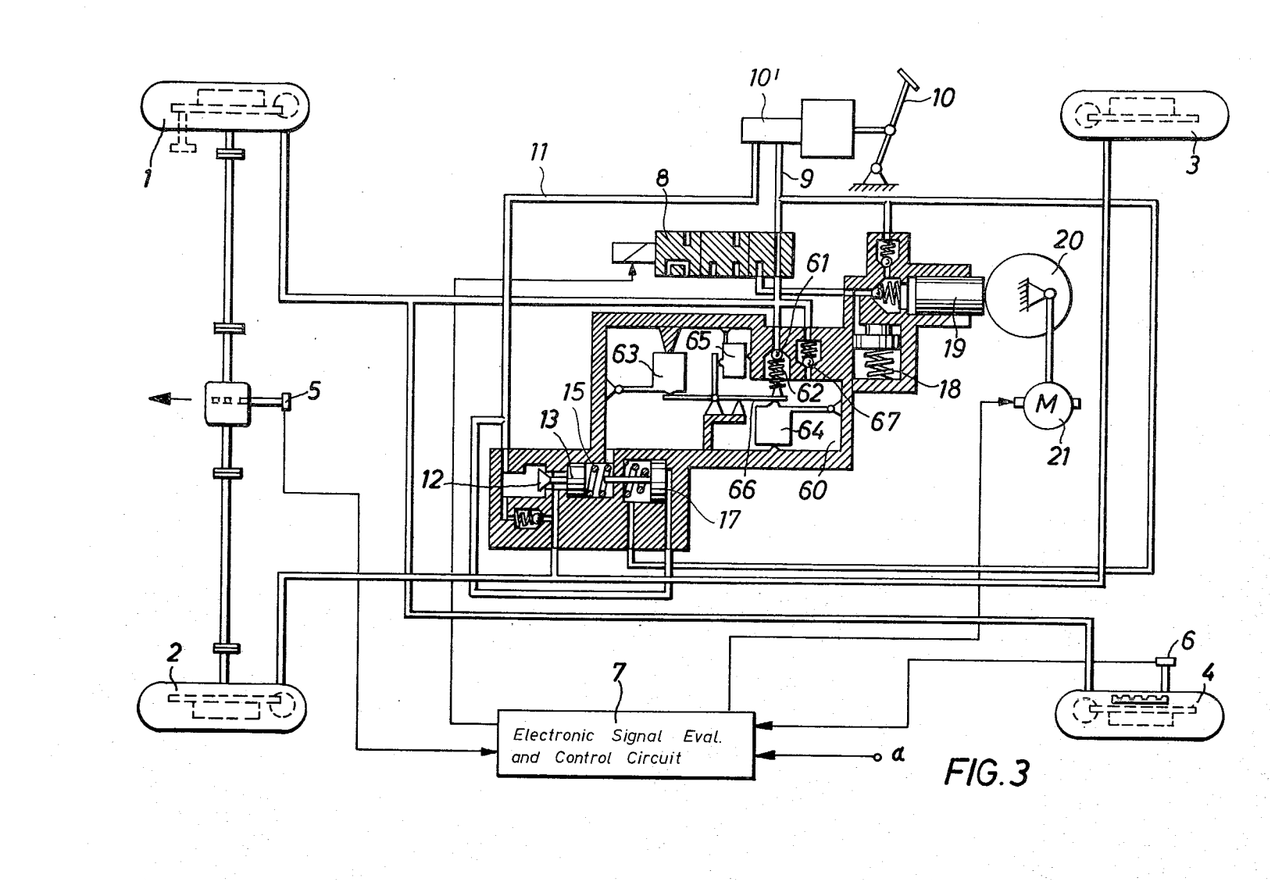
FIG. 3 is a schematic diagram of a further embodiment of the invention wherein the transverse acceleration and the longitudinal deceleration of the vehicle influence the difference in pressure between the regulated and the controlled pressures in the brake pressure control valve for the unregulated brake circuit.

The embodiment of the anti-locking brake control system of FIG. 3 again shows a vehicle with front wheel drive wherein the rotational behavior of the diagonally opposite wheels 1 and 4 is being sensed by sensors 5 and 6 and the brakes of these wheels 1 and 4 are included in the brake circuit 9 whose pressure is regulated by means of a three stage pressure regulating valve 8. The pressure medium return devices 18 to 21 are also the same as in FIG. 1. The brake circuit 11 leading to the brakes of wheels 2 and 3 is in this embodiment also conducted through a brake pressure control valve 12. The valve 12 is connected with piston 13 which normally maintains the valve 12 in an open position by means of a spring 15. In the embodiment of FIG. 3, the surface of the piston 13 facing the valve 12 is exposed to the pressure $P_{ST}$ supplied to the brakes of wheels 2 and 3 and the opposite surface of piston 13 is exposed to the pressure in a chamber 60 which is related or corresponds to the regulated pressure $P_R$. This chamber 60 is connected, via a one-way valve 61, which is pretensioned by means of a spring 62, with the output line of regulating valve 8 leading to the brakes of wheels 1 and 4. Consequently, the pressure in chamber 60 is less than by a value $\Delta_p$ than the regulated pressure $P_R$. This pressure value $\Delta_p$, is dependent on the tension of the spring 62. According to the embodiment of FIG. 3, the pressure value $\Delta_p$ is variable and depends on the longitudinal deceleration and transverse acceleration of the vehicle in that a change in the transverse acceleration and/or longitudinal deceleration produces a change in the tension of spring 62. In order to produce this result, the spring 62 is supported on one end of a pivotally supported lever 66 and masses 63 and 64, which are pivotally mounted so that they are responsive to the transverse acceleration of the vehicle, and a mass 65, which is pivotally mounted so that it is responsive to the longitudinal deceleration of the vehicle, are disposed adjacent the lever 66 so that they can exert forces on the lever 66 to pivot same. With the illustrated arrangement, either a transverse acceleration toward the left of the vehicle, causing mass 63 to move, a transverse acceleration toward the right of the vehicle, causing mass 64 to move, or a longitudinal deceleration of the vehicle, causing mass 65 to move, will pivot lever 66 and thus increase the tension in spring 62. Correspondingly, the pressure difference $\Delta_p$ between the regulated pressure $P_R$ and the pressure in chamber 60 is increased. This means that with increasing transverse acceleration and/or longitudinally deceleration, valve 12 closes at a low pressure value, i.e., the introduced pressure in circuit 11 becomes less than the regulated pressure in brake circuit 9. The one-way valve 67 connected in parallel with the valve 62 serves for the later pressure reduction.

Figure 4:
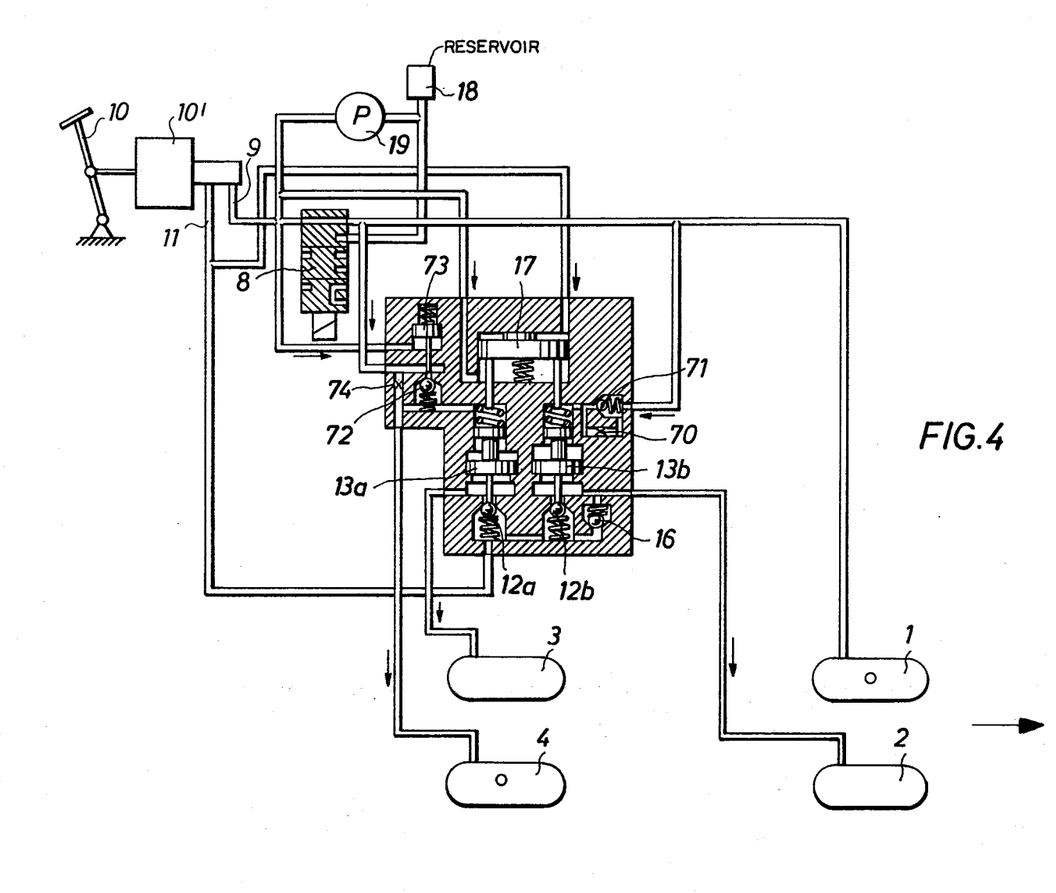
FIG. 4 is a schematic diagram of another embodiment of the invention with two brake pressure control valves.

In the embodiment of FIG. 4, as in the previous figures, the front wheels are marked 1 and 2, the rear wheels are marked 3 and 4, the three stage pressure regulating valve bears the reference numeral 8, the pressure medium return device is 18, 19, and the diagonally disposed wheels 1 and 4 are the wheels whose rotational behavior is being sensed and whose wheel brakes are jointly regulated by the output pressure from regulating valve 8.

In this embodiment the brakes of wheels 2 and 3 receive a separate introduction of a different pressure by means of separate pressure control valves 12a and 12b having a safety valve 16 connected in parallel with the valve 12b. The valves 12a and 12b are kept open in this embodiment as in the embodiment of FIG. 1, by dual pistons 13a and 13b as long as the pressure $P_{ST}$ in the brake circuit 11 and applied to the brakes of the wheels 2 and 3 via the valves 12a and 12b is not in a certain ratio to the regulated pressure $P_R$ in the brake circuit 9 which is applied to the opposite side of the pistons. Since corresponding piston surfaces are different, the valves close at different pressure ratios, i.e. at the front wheel the introduced pressure is lower at the beginning. Due to the presence of pressure choke 70 the pressure $P_R$ in front of the small surface of dual piston 13b will build up only slowly. Furthermore, piston 13b and its cylinder are designed so that piston 13b can still move upward (in the illustration) after valve 12b has closed. That means that with the first increase in brake pressure, with a high input pressure from the master cylinder 10', until the regulation in the brake circuit 9 begins the pressure at the brake of unregulated wheel 2 is built up rapidly until valve 12b closes, that during pressure reduction in the regulated brake circuit the pressure in front of the small surface of the dual piston 13b is also reduced via check valve 71 (so that the dual piston 13b moves upward), and that when the pressure increases in the regulated brake circuit, the pressure at the brake of wheel 2 is built up slowly due to the presence of choke 70 while the controlled pressure at the brake of wheel 3 follows the regulated pressure $P_R$ much faster. Therefore the pressure at unregulated rear wheel 3 can become higher than at the front wheel.

The piston 17 of FIG. 4 corresponds to the piston 17 of FIG. 1, i.e., if the regulated brake circuit is malfunctioning it keeps both valves 12a and 12b open. Connected in the regulated brake pressure line for the pressure build-up at the rear wheel 4 is the parallel connection of a valve 72, which is kept open by piston 73 as long as the pressure generated by the master brake cylinder 10' lies below, for example, 10 bar, and a pressure choke 74 having a low choking action. This has the effect that the pressure at the regulated right rear wheel 4 is reduced only slowly during regulation.

Figure 5:
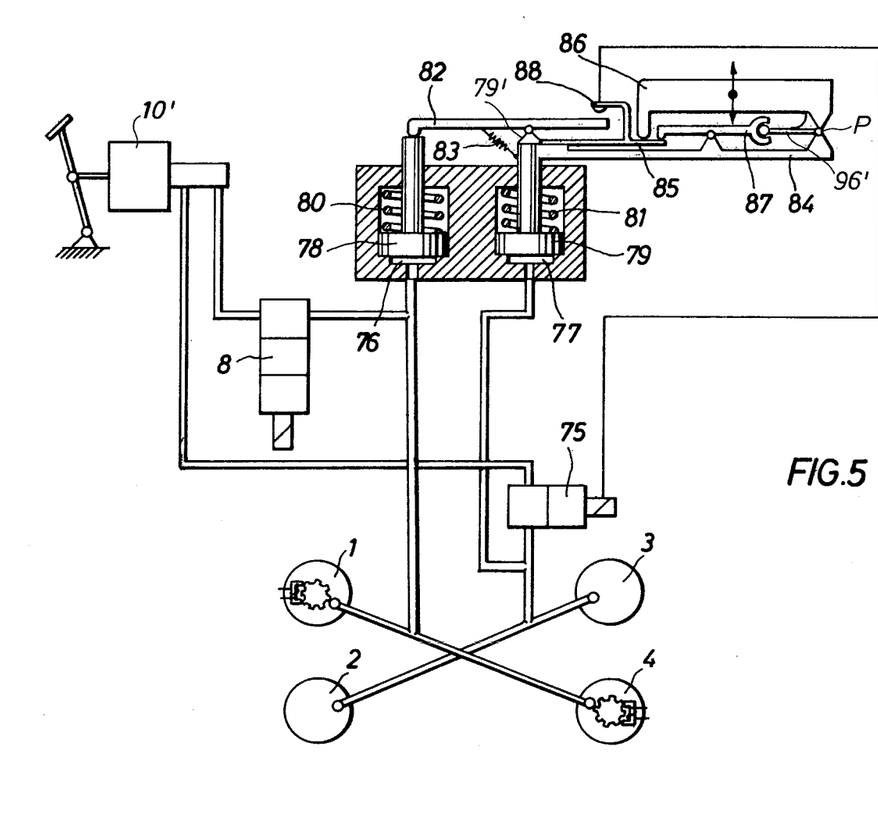
FIG. 5 is a schematic diagram of still a further embodiment of the invention with a completely different design for the brake pressure control valve.

In the embodiment of FIG. 5 the brakes of the diagonally disposed wheels 1 and 4 are again connected to an anti-locking pressure regulating valve 8 (three-stage valve) and the two other wheels are connected with the main brake cylinder via a magnetic pressure control valve 75. The outputs of valves 8 and 75 are connected with cylinder chambers 76 and 77 respectively in which pistons 78 and 79 respectively are normally held in the illustrated position by springs 80 and 81 respectively having different spring forces. A lever 82 is pivotally mounted on the top of a plunger 79' connected with piston 79 and has one of its free ends in contact with the top of a plunger 78' connected to the piston 78 by means of a spring 83. A laterally extending rod 84 and spring 85 are connected to the plunger 79'. A mass 86 is mounted on the rod 84 so that it has one end pivotally connected to the rod 84 at point P and has its other end resting on the spring 85. The mass 86 is additionally provided with an arm 86' which engages one end of a tilt lever 87 which is mounted on rod 84 and has its other end also resting on spring 85. With this arrangement, a transverse acceleration in either direction (as indicated by the arrow) will bend the spring 85 downwardly either directly or via tilt lever 87. This will cause the switch contact 88 which is mounted on the spring 85 adjacent the other free end of lever 82 to come closer to lever 82. The position of this lever 82 is dependent on the relative positions of pistons 78 and 79 and thus on the regulated pressure at the brakes of wheels 1 and 4 and the pressure introduced at wheels 2 and 3, respectively. The spring 81 in cylinder chamber 77 is the weaker spring so that at a certain pressure ratio lever 82 is pivoted so strongly that switch 88 is actuated, thus closing valve 75. With transverse accelerations the pressure difference at which the valve 75 is closed becomes greater.

Figure 6:
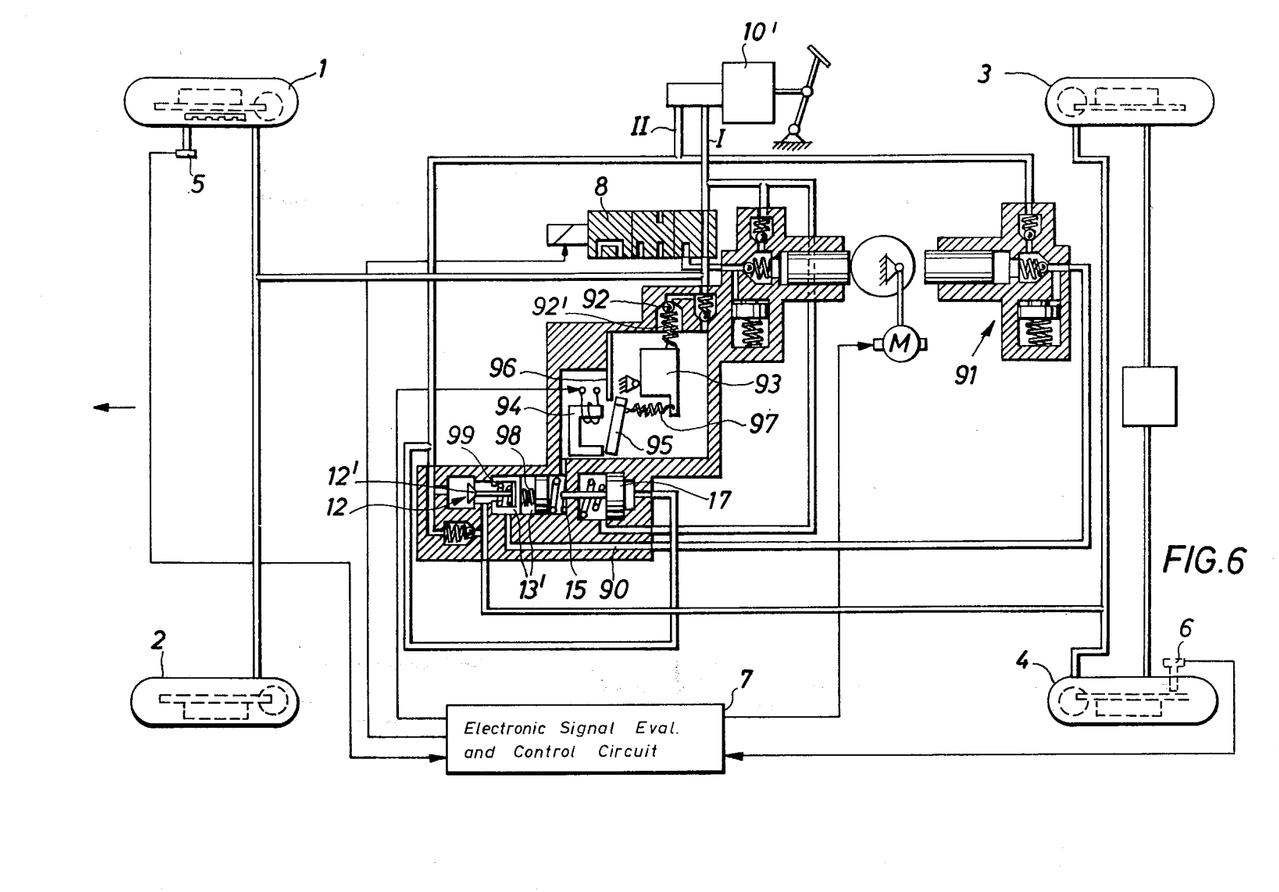
FIG. 6 is a schematic illustration of another embodiment of the invention wherein the pressure at the brakes of the front wheels of the vehicle are regulated and the axle load of the vehicle is used to influence the pressure difference controlling the pressure control valve in the unregulated brake circuit.

Another embodiment of the invention is shown in FIG. 6. In this embodiment the sensors 5 and 6 for the wheel movement behavior are again disposed on the diagonally disposed wheels 1 and 4 respectively but the pressure of the brakes of the front wheels 1 and 2 is regulated jointly by means of pressure regulating valve 8 in brake circuit I and the brake pressure of the rear wheels 3 and 4 is controlled by means of the control valve 12' in the brake circuit II. In this embodiment, it is preferable to take the axle load on the rear wheels of the vehicle into consideration. However, the pressure reduction in the brake circuit influenced by valve 12 as illustrated here can be used in the same manner in all other embodiments of the invention.

According to the embodiment of FIG. 6, in order to produce the desired pressure reduction at the rear wheels, the dual piston 13 of the previous embodiments is modified somewhat so that the dual piston 13' includes two pistons which are separated by a spring 98 and the movable valve body 12' of valve 12 is connected to one surface of the dual piston 13' by means of a spring 99 which normally holds the movable valve body 12' in the illustrated position with respect to the piston 13' but which permits the piston 13' to move toward the right in the illustrated embodiment even after the valve body 12' is seated on valve seat, thus closing valve 12, if the pressure acting on the right-hand surface of dual piston 13' should drop. Additionally, the wall of the cylinder surrounding the dual piston 13' is provided with and opening 90, which is positioned so that it is normally closed by the left portion of the dual piston 13' but will be opened if the dual piston 13' should continue its movement after closing of the valve 12. The opening 90 is connected to a pressure medium return line which, via a separate return pump 91, recirculates the pressure medium discharge via opening 90. With this arrangement, after closing of valve 12, the further movement of dual piston 13' as a result of a pressure drop on the right surface thereof will uncover the opening 90 and reduce the pressure applied to the brakes of rear wheels 3 and 4 until the previous relationship between the pressure introduced by the master cylinder 10' and the regulated pressure has been reestablished, in which case the opening 90 will again be closed.

As in the embodiment of FIG. 3, in the embodiment of FIG. 6, a valve 92 is provided which determines the pressure difference between the regulated and controlled pressures. This difference in pressure can be varied by the mass 93 which provides the support for the spring 92' of valve 92 and which is pivotally mounted so that it responds to the longitudinal deceleration of the vehicle and increases the tension in spring 92' with increasing longitudinal deceleration. Thus the pressure difference will also increase with increasing vehicle deceleration. However, since with increasing load on the rear wheels these wheels can handle a higher pressure, according to this embodiment of the invention, the load state of the vehicle is used to counteract the influence of the longitudinal deceleration on the pressure difference. Accordingly, a switching arrangement is provided, for example, on the rear axle, which switching arrangement normally will not let a signal pass but which will permit a pulse train to pass beginning with a certain load state and continuous signals beginning with a second higher load state. These signals are fed to the winding electromagnet 94 which cooperates with a pivotal lever 95 of magnetic material which in turn is connected to the mass 93 via a spring 97. A spring 96 is also provided in the path of movement of the lever 96. During the time the pulsating signal is applied to electromagnet 94, the lever 95 is intermittently brought into contact with the spring 96, while during the time the continuous signal is applied to the electromagnet 94, the lever will be pivoted further to the left. Thus spring 97 is tensioned to a greater or lesser degree depending on the load state of the vehicle and counteracts the influence of the longitudinal deceleration on the pressure difference to a greater or lesser extent.

It must be mentioned that instead of the deceleration response in masses shown in the illustrated embodiments, the deceleration of the vehicle can also be determined in a known manner from a measurement of the deceleration of the wheels of the vehicle.

Figure 7:
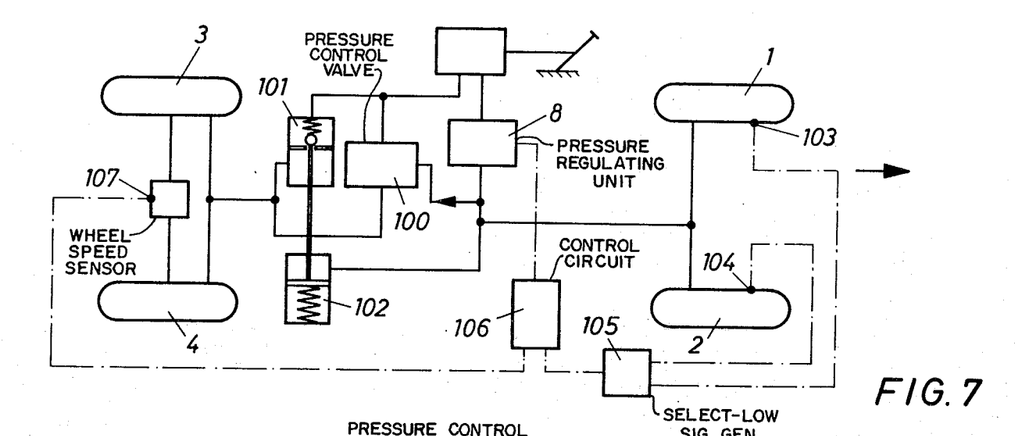
FIG. 7 is a schematic illustration of another embodiment of the invention.

In FIG. 7 the two front wheels 1 and 2 form one brake circuit and are connected to the pressure regulating unit. The rear wheels 3 and 4 are connected to the brake pressure control valve 100, which may be similar to that of FIG. 1. Parallel to the control valve 100 is provided a valve 101. This valve is normally open, but it closes, if a brake pressure of a given small value is present in the first brake circuit. Thus this valve 101 opens if during the pressure drops in the first brake circuit because of a leakage; hereby it is possible to brake with the second brake circuit. The opening of the valve 101 is attained by means of a piston 102; this piston 102 is in its upper position (and opens valve 101) if the pressure at the output of unit 8 reaches at least a given value.

Figure 8:
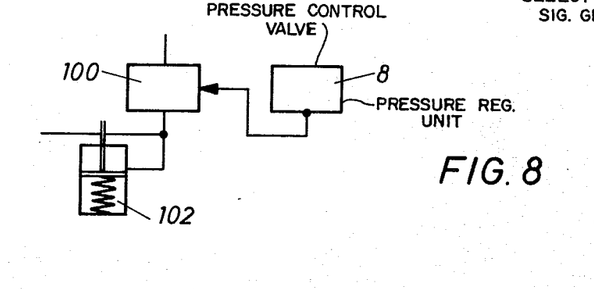
FIG. 8 shows a variation of a detail of the embodiment of FIG. 7.

FIG. 8 shows a variation of FIG. 7 in so far, as there the piston 102 is exposed to the pressure at the output of valve 100.

In FIG. 7 the two front wheels are provided with sensors 103 and 104. The signals of both sensors are fed to a circuit 105, which feeds a signal to the circuit means 106, if at least one wheel shows a locking tendency (select-low). This signal is evaluated in the circuit means 106 together with signals coming from sensor 107 at the differential of the vehicle to generate control signals for the pressure regulating unit 8.

It will be understood that the above description of the present invention is susceptible to various modifications, changes and adaptations, and the same are intended to be comprehended within the meaning and range of equivalents of the appended claims.

What is claimed is:

1. In an anti-locking control system for the brakes of a four wheel vehicle having dual brake circuits controlled by a single master cylinder and with each brake circuit connected to the brakes associated with two of said wheels, said control system including, a brake pressure regulating unit connected in one of said brake circuits for jointly regulating the brake pressure at the brakes of the two of said wheels associated with said one brake circuit, means for sensing the rotational behavior of two diagonally opposite ones of said wheels, and circuit means, connected to said sensing means, for evaluating the output signals from said sensing means and for generating brake pressure control signals for controlling said pressure regulating unit, the improvement wherein said two wheel brakes connected to said one brake circuit are the brakes associated with said diagonally opposite wheels whose rotational behavior is being sensed or the brakes associated with the steered wheels of the vehicle; and wherein said anti-locking control system further includes: switching means connected to said control circuit means for alternatingly producing a first operating state of said control circuit in which the pressure is regulated when there is a tendency to lock at one wheel whose rotational behavior is sensed and a second operating state in which the pressure is regulated when there is a tendency to lock at both wheels whose rotational behavior is sensed; a normally open brake pressure control valve connected in the other of said dual brake circuits; and means responsive to the pressure ($P_{ST}$) at the two brakes connected to the output of said brake pressure control valve and to the pressure ($P_R$) at the output of said brake pressure regulating unit, for closing said brake pressure control valve when the pressure $P_{ST}$ has a given relationship to the pressure $P_R$.

2. An anti-locking control system as defined in claim 1 wherein said means for closing said control valve closes said control valve when a given pressure ratio $P_{ST}/P_R$ which is somewhat less than 1 is reached.

3. An anti-locking control system as defined in claim 1 wherein: said closing means closes said control valve upon a predetermined difference between pressures corresponding to said pressure $P_{ST}$ and $P_R$; and said closing means includes means responsive to the transverse acceleration of the vehicle, and means, cooperating with said transverse acceleration responsive means, for increasing the difference between said pressures corresponding to said pressures $P_{ST}$ and $P_R$ with increasing values of transverse acceleration of said vehicle.

4. An anti-locking control system as defined in claim 1 wherein: said closing means closes said control valve upon a predetermined difference between pressures corresponding to said pressures $P_{ST}$ and $P_R$; and said closing means includes means responsive to the longitudinal deceleration of the vehicle and means, cooperating with said longitudinal deceleration responsive means, for increasing the difference between said pressures corresponding to said pressures $P_{ST}$ and $P_R$ with increasing longitudinal deceleration values of said vehicle.

5. An anti-locking control system as defined in claim 4 wherein: said closing means further includes means responsive to the transverse acceleration of said vehicle, and said means for increasing the pressure difference also cooperates with said transverse acceleration responsive means to increase the pressure difference between said pressures corresponding to $P_{ST}$ and $P_R$ with increasing transverse acceleration with the influence on the pressure difference caused by the longitudinal deceleration being less than that caused by corresponding transverse acceleration value.

6. An anti-locking control system as defined in claim 4 further comprising means for determining the load state of the vehicle; and wherein said closing means further includes means, responsive to said load state determining means, for influencing the effect of the longitudinal deceleration on the difference between the pressures corresponding to $P_R$ and $P_{ST}$ so that with increasing load the influence of the longitudinal deceleration value becomes less.

7. An anti-locking control system as defined in claim 6 wherein said means responsive to said load state determining means effects a change in the influence of the longitudinal deceleration value in a stepwise manner.

8. An anti-locking control system as defined in claim 1 wherein said pressure control valve includes means for reducing the brake pressure $P_{ST}$ during full braking when the regulated brake pressure $P_R$ drops.

9. An anti-locking control system as defined in claim 1 wherein said means for closing includes: a movable member movably mounted within a housing which defines a pair of chambers on opposite sides of said movable member; first means for introducing said pressure corresponding to the pressure $P_{ST}$ into one of said chambers; second means for introducing said pressure corresponding to the pressure $P_R$ into the other of said chambers, and means coupled to said movable member for moving the movable valve body of said brake pressure control valve.

10. An anti-locking control system as defined in claim 9 wherein said second means includes a pretensioned one-way valve disposed in the pressure line connecting the pressure $P_R$ at the output of said brake pressure regulating unit to said other chamber.

11. An anti-locking control system as defined in claim 10 wherein said closing means further includes means responsive to the longitudinal deceleration of said vehicle; means responsive to the transverse acceleration of said vehicle; and means, responsive to said longitudinal deceleration responsive means and to said transverse acceleration responsive means, for varying the pretensioning of said one-way valve to increase the pressure difference between the two pressures on opposite sides of said movable member.

12. An anti-locking control system as defined in claim 11 wherein: said pretensioned one-way valve includes a spring mounted on a support for pretensioning the movable valve member of said one-way valve; and said means for varying the pretensioning comprises a pivotal lever on which said support for said spring is mounted and which is responsive to the forces produced by said transverse acceleration responsive means and/or said longitudinal deceleration responsive means to displace said spring support and increase the tension in said spring.

13. An anti-locking control system as defined in claim 9 wherein said movable member is displaceable piston which is mounted within a cylinder in said housing.

14. An anti-locking control system as defined in claim 13 wherein said displaceable piston is a dual piston with a spring disposed therebetween.

15. An anti-locking control system as defined in claim 9 wherein: said means for moving said movable valve body of said pressure control valve includes a spring coupled between said movable valve body of said pressure control valve and one surface of said dual piston so as to permit said dual piston to move with a limited range after said brake pressure control valve has been closed; and wherein the wall of said cylinder surrounding said piston is provided with an opening which is normally closed by said piston and which leads to a brake pressure return line, said opening being disposed as such a location that when said brake pressure control valve is closed and said pressure $P_R$ is dropping, the resulting movement of said piston uncovers said opening to produce a connection between the brake line leading to the unregulated brakes and return line, thus reducing the pressure $P_{ST}$.

16. An anti-locking control system as defined in claim 9 further including means for maintaining said brake pressure control valve in an open position when said regulated one of said brake circuits malfunctions, said maintaining means including a movable piston mounted within a cylinder and having its opposite surfaces exposed to the respective pressure produced in said dual brake circuits by said master brake cylinder, and means mounted on said piston for movement therewith for opening said brake pressure control valve upon movement of said piston.

17. An anti-locking control system as defined in claim 9 wherein said two wheels which are connected to said one brake circuit, and thus regulated, are the two diagonally disposed wheels of the vehicle; and a pair of said brake pressure control valves and associated closing means, each of said brake pressure control valves being connected in the brake line to a respective one of the other two wheels of said vehicle.

18. An anti-locking control system as defined in claim 17 further comprising: a pressure choke disposed in the brake line leading to the regulated rear wheel brake, and a one-way valve, which opens when the pressure increases, connected in parallel with said choke so that the pressure reduction is slowed down through the choke position.

19. An anti-locking control system as defined in claim 9 wherein said movable member is movable even after closing of the associated said brake pressure control valve so that a limited pressure reduction is effected in the controlled brake circuit when there is a pressure reduction in the regulated brake circuit.

20. An anti-locking control system as defined in claim 19 wherein each of said movable members is a piston mounted for movement in a cylinder; and wherein the cylinder chamber in which pressure $P_R$ exists is connected, via a pressure choke and a one-way valve which discharges pressure medium from said cylinder chamber and which is connected in parallel with said pressure choke, with the brake line in which the regulated pressure $P_R$ exists.

21. An anti-locking control system as defined in claim 20 wherein said choke and said one-way valve are connected to the control valve which controls the pressure at the controlled front wheels whereby a limited pressure reduction and a slow pressure build-up takes place via the choke at the brake of the controlled front wheel.

22. An anti-locking control system as defined in claim 21 wherein the surface of said movable member which is exposed to said pressure $P_R$ is the smaller surface.

23. An anti-locking control system as defined in claim 9 wherein the surfaces of said movable member which are exposed to the pressures $P_{ST}$ and $P_R$ have different dimensions.

24. An anti-locking control system as defined in claim 1 wherein said brake pressure control valve is a magnetically controlled valve; and wherein said closing means comprises: first and second adjacent pretensioned movable members; means for applying said pressure $P_R$ to one surface of one of said movable members and for applying said pressure $P_{ST}$ to one surface of the other of said movable members; a lever pivotally mounted on the opposite surface of one of said movable members and having one of its free ends in contact with the opposite surface of the other of said movable members whereby the position and pivot angle of said lever are determined by the pressure difference exerted on said movable members; an electrical switch connected to and controlling said magnetically actuated control valve; and means for mounting said switch adjacent to the other free end of said lever whereby said switch will be actuated when contacted by said other free end at a certain pivot angle corresponding to the desired pressure ratio between said pressures $P_{ST}$ and $P_R$.

25. An anti-locking control system as defined in claim 24 wherein: a further electrical switch is mounted adjacent said other free end of said lever for actuation thereby when the pressure ratio increases beyond a predetermined limit value; said magnetically actuated valve is provided with a further position in which the brakes connected thereto are connected with a return line; and said further electrical switch is connected to said magnetically actuated valve to cause same to be switched into said further position when said further switch is actuated by said lever.

26. An anti-locking control system as defined in claim 24 wherein said closing means further includes one mass which is mounted so that it is deflected by the transverse acceleration of said vehicle; and wherein said means for mounting said switch is responsive to the deflection of said mass to displace said electrical switch to reduce the distance between said other free end of said lever and said electrical switch.

27. An anti-locking control system as defined in claim 1 further comprising a one-way valve serving as a safety valve connected in parallel with said brake pressure control valve, said safety valve being oriented to open when the pressure at its input is substantially higher than the pressure at the output of said brake pressure control valve.

28. An anti-locking control system as defined in claim 1 further comprising a safety valve connected in parallel with said brake pressure control valve, said safety valve being connected with a piston which is subjected to said regulated brake pressure $P_R$ in a manner so that said safety valve is closed when said regulated pressure $P_R$ increases beyond a given value.

29. An anti-locking control system as defined in claim 1 further comprising a safety valve connected in parallel with said brake pressure control valve, said safety valve being connected with a piston which is subjected to said pressure $P_{ST}$ in a manner so that said safety valve closes when said pressure $P_R$ increases beyond a given value.

30. An anti-locking control system as defined in claim 1 wherein said control circuit means includes a first circuit means for evaluating the output signals from said sensing means and said for producing acceleration, deceleration and/or slip signals therefrom, and control logic circuit means, responsive to said signals from said first circuit means, for generating said control brake pressure control signals for said pressure control unit; and further comprising: means responsive to the transverse acceleration of the vehicle for generating an output signal corresponding thereto; and switching means, responsive to the output signals from said transverse acceleration responsive means for effecting a pressure reduction in said regulated one of said brake circuits at a given reduction in the amount of transverse acceleration within a given time period when a slip signal is present simultaneously.

31. An anti-locking control system as defined in claim 1 wherein said control circuit means includes a first circuit means for evaluating the output signals from said sensing means and for producing acceleration, deceleration and/or slip signals therefrom, and control logic circuit means, responsive to said signals from said first circuit means, for generating said control brake pressure control signals for said pressure control unit; and further comprising: a steering angle sensor for the vehicle for producing an output signals when a given steering angle has been reached; and switching means responsive to the output signal from said steering angle sensor for controlling said brake pressure regulating unit to cause a pressure reduction in said regulated one of said circuits when said given limit steering angle has been reached.

32. An anti-locking control system as defined in claim 31 further comprising means for varying the steering angle value at which said steering angle sensor produces an output signal in dependence on the vehicle speed so that with increasing vehicle speed said steering angle sensor will produce an output with smaller steering angle values.

33. An anti-locking control system as defined in claim 32 further comprising means for varying the steering angle value at which said steering angle sensor produces an output signal in dependence on the deceleration of the vehicle so that the steering angle value at which said steering angle sensor produces an output signal increases with increasing vehicle deceleration.

34. An anti-locking control system as defined in claim 1 wherein: said sensing means comprises first and second sensors for respectively sensing the rotational behavior of two diagonally disposed wheels of the vehicle; and said switching means causes the output signals from said first and second sensors to be alternatingly evaluated in said control circuit means.

35. An anti-locking control system as defined in claim 34 wherein said switching means comprises means for alternatingly connecting the outputs of said first and second sensors to the input of said control circuit means.

36. An anti-locking control system as defined in claim 35 further comprising means responsive to the initiation of a braking action for the vehicle for controlling said switching means to cause the output signals from the one of said first and second sensors associated with the regulated front wheel of the vehicle to initially be connected to the input of said control circuit means for a period of time to effect the regulation.

37. An anti-locking control system as defined in claim 36 further comprising means connected to said switching means for controlling same to switch from said initially connected sensor associated with the regulated front wheel to the other of said sensors only temporarily if no signal indicating a tendency to lock is determined there.

38. An anti-locking control system as defined in claim 36 further comprising: means for measuring the deceleration of the vehicle and for providing an output signal when a given deceleration value is reached; and means responsive to said deceleration value output signal for varying the switching time period of said switching means.

39. An anti-locking control system as defined in claim 38 wherein said means for varying the switching time period is additionally responsive to said slip signal for shortening the time period the sensor associated with the rear wheel of the vehicle is connected to said control circuit means to a time $t_1$ which is shorter than the basic time period $t_0$ if a high slip value is present when said rear wheel sensor is connected and a low value of vehicle deceleration is present.

40. An anti-locking control system as defined in claim 39 wherein said means for varying the switching time period additionally includes means for shortening the time the sensor associated with the front wheel of the vehicle is connected to said control circuit means to the time which is shorter than said basic time period $t_0$ if a high slip value is present when said front wheel sensor is connected and a low value of vehicle deceleration is present.

41. An anti-locking control system as defined in claim 38 further comprising: means for measuring the individual pressure build-up times in said regulated brake circuit during the period of time one of said first and second sensors is connected to said control circuit means; means for storing a signal which corresponds to the last pressure build-up time $t_a$; further switching means responsive to the output signal from said deceleration measuring means for effecting a controlled pressure increase in the regulated brake circuit for a short time $t_b = a\ t_a$, where $a > 1$, after switching to the other of said first and second sensors, if only a slight vehicle deceleration is detected.

42. An anti-locking control system as defined in claim 41 wherein said further switching means causes a phase of constant pressure to follow said controlled pressure increase.

43. An anti-locking control system as defined in claim 41 wherein the diagonally opposed wheel brakes of the vehicle are regulated, and further comprising: a steering angle detector means for producing an output signal when a predetermined steering angle is detected; and means, responsive to the output signal from said deceleration measuring means and the output signal from said steering angle detector means indicating a turn in a direction away from the regulated front wheel, for controlling said switching means to maintain the connection of the one of said first and second sensors associated with the front wheel of the vehicle to the control circuit means until a given vehicle deceleration has been reached and then switch to the other of said first and second sensors for a period of time, for causing said storing means to store a signal corresponding to the last pressure build-up time $t_a$ during the period of time said other sensor is connected to said control circuit means, and for causing an increase in the pressure in said regulated brake circuit according to $t_b = a\ t_a$ during the subsequent period of connection of said sensor associated with the front wheel of the vehicle.

44. An anti-locking control system as defined in claim 34 further comprising means connected to said switching means for controlling the time periods during which the output signals from one of said first and second sensors is connected to said first control circuit means to effect the regulation between a basic time period $t_0$ and a variable time period therebetween which lies between the time of switching to the then connected one of said first and second sensors and the first pressure reduction thereafter in said regulated brake circuit.

45. An anti-locking control system as defined in claim 34 further comprising means connected to said switching means for controlling the time periods in which the output signals from one of said first and second sensors is connected to said control circuit means to effect the regulation between a fixed basic time $t_0$ and a time period following thereafter which is terminated when the slip signal from said control circuit means falls below a certain value and/or the acceleration signal from said control circuit means ends.

46. An anti-locking control system as defined in claim 34 further comprising steering angle detector means for producing an output signal when a predetermined steering angle is detected; and means responsive to said steering angle output signal for causing said switching means to connect said wheel sensor associated with the front wheel of said vehicle to said control circuit means for the duration of said steering angle output signal and for a time period thereafter which is long compared to the basic switching period $t_0$.

47. An anti-locking control system as defined in claim 34 wherein the one of said first and second sensors which monitors the rotational behavior of the driven wheel of the vehicle is mounted on the differential of the vehicle.

48. An anti-locking control system as defined in claim 47 wherein said control circuit means includes switching means for switching to a higher reference slip value when switching from evaluation of the signals from the one of said first and second sensors disposed at the vehicle wheel to said sensor mounted on the differential.

49. An anti-locking control system as defined in claim 1 wherein the diagonally opposite wheels of the vehicle are connected to said regulated brake circuit, wherein an additional sensor is provided at the unregulated front wheel of the vehicle; and wherein the signals from said additional sensor are fed to said control circuit means and evaluated together with the output signals from the one of said first and second sensors associated with the regulated front wheel in select-low operation.

50. An anti-locking control system as defined in claim 49 wherein said control system is used in an embodiment which permits pressure reduction, preferably a pressure reduction which is limited by the movement of the pistons.

51. An anti-locking control system as defined in claim 1 wherein said control circuit means causes the pressure build-up and/or pressure reduction in said regulated brake circuit to the take place in a pulsed manner.

* * * * *